United States Patent
Defranceski et al.

(10) Patent No.: US 10,634,243 B2
(45) Date of Patent: Apr. 28, 2020

(54) METHOD FOR MONITORING FUNCTIONAL STATES A PRESSURE DRIVEN ACTUATOR AND PRESSURE-ACTUATABLE ACTUATOR

(71) Applicant: J. Schmalz GmbH, Glatten (DE)

(72) Inventors: Aline Defranceski, Horb a.N. (DE); Walter Dunkmann, Baden-Baden (DE)

(73) Assignee: J. Schmalz GmbH, Glatten (DE)

( * ) Notice: Subject to any disclaimer, the term of this patent is extended or adjusted under 35 U.S.C. 154(b) by 176 days.

(21) Appl. No.: 15/589,044

(22) Filed: May 8, 2017

(65) Prior Publication Data

US 2017/0321799 A1    Nov. 9, 2017

(51) Int. Cl.
*F16H 61/00* (2006.01)
*F16H 61/4017* (2010.01)
(Continued)

(52) U.S. Cl.
CPC .......... *F16H 61/0021* (2013.01); *B25J 9/142* (2013.01); *B25J 13/087* (2013.01); *B25J 15/0023* (2013.01); *B25J 15/0616* (2013.01); *B25J 15/12* (2013.01); *F16H 61/4017* (2013.01); *F16H 61/433* (2013.01); *F16H 2059/6861* (2013.01);
(Continued)

(58) Field of Classification Search
CPC . B25J 1/02; B25J 15/06; B25J 15/0616; B25J 15/08; B25J 18/06; B25J 19/02
See application file for complete search history.

(56) References Cited

U.S. PATENT DOCUMENTS 3,712,481 A * 1/1973 Harwood ................... B25J 3/04
  414/7
3,743,340 A * 7/1973 Williamann .......... B66C 1/0212
  294/186

(Continued)

FOREIGN PATENT DOCUMENTS

DE        4229834 A1    3/1993
DE   102007061820 A1    6/2009
(Continued)

OTHER PUBLICATIONS

EP Search Report for Application 16168786.8-1807, dated Nov. 16, 2016, 10 pages.
(Continued)

*Primary Examiner* — David A Rogers
(74) *Attorney, Agent, or Firm* — Bond Shoeneck & King, PLLC; George McGuire

(57) ABSTRACT

The invention relates to a method for monitoring a functional state of a pressure-driven actuator which comprises an actuator compartment defined at least in portions by a flexibly deformable wall, the actuator being actuated by applying pressure to the actuator compartment by means of an operating pressure supply, a work process being carried out to actuate the actuator, which process is accompanied by the actuator transitioning from a starting configuration to an end configuration. The pressure the pressure applied to the actuator compartment is measured depending on time by means of a sensor apparatus during the transition from the starting configuration to the end configuration. The invention also relates to a pressure-driven actuator.

14 Claims, 5 Drawing Sheets

(51) Int. Cl.
  *F16H 61/433* (2010.01)
  *B25J 15/06* (2006.01)
  *B25J 15/12* (2006.01)
  *B25J 9/14* (2006.01)
  *B25J 15/00* (2006.01)
  *B25J 13/08* (2006.01)
  *F16H 59/68* (2006.01)

(52) U.S. Cl.
  CPC .......... *F16H 2061/0034* (2013.01); *F16H 2061/0046* (2013.01); *F16H 2061/0075* (2013.01)

(56) References Cited

U.S. PATENT DOCUMENTS

| | | | | |
|---|---|---|---|---|
| 4,237,455 A * | 12/1980 | Beckley | ............. | B66C 1/04 294/65.5 |
| 4,413,853 A * | 11/1983 | Andersson | ............. | B66C 1/0293 294/186 |
| 4,509,377 A * | 4/1985 | Mentzell | ............. | G01M 99/007 73/862.56 |
| 4,643,031 A * | 2/1987 | Mentzell | ............. | G01M 99/007 73/862.56 |
| 4,781,520 A * | 11/1988 | Balter | ............. | H01J 37/20 414/8 |
| 5,117,675 A * | 6/1992 | Notoyama | ............. | G01L 19/12 73/37 |
| 5,284,416 A * | 2/1994 | Schmidt | ............. | B25J 15/0616 294/185 |
| 5,330,314 A * | 7/1994 | Bennison | ............. | B66C 1/0212 294/186 |
| 5,470,117 A * | 11/1995 | Schmidt | ............. | B25J 15/0616 294/185 |
| 5,617,338 A | 4/1997 | Sugano et al. | | |
| 6,056,500 A * | 5/2000 | Wicen | ............. | B66C 1/0256 212/284 |
| 6,176,113 B1 | 1/2001 | White, III | | |
| 6,557,429 B1 * | 5/2003 | Asquith | ............. | B66C 1/04 335/212 |
| 7,140,389 B2 * | 11/2006 | Schnatterer | ............. | F04F 5/20 137/565.23 |
| 7,175,504 B2 * | 2/2007 | Izumi | ............. | B24B 37/11 451/289 |
| 7,263,890 B2 * | 9/2007 | Takahashi | ............. | B25J 15/0616 73/700 |
| 7,917,325 B2 * | 3/2011 | Bredau | ............. | F15B 19/005 702/114 |
| 7,950,422 B2 * | 5/2011 | Perlman | ............. | B25B 11/007 141/65 |
| 8,109,548 B2 * | 2/2012 | Jansson | ............. | B66C 1/0256 294/186 |
| 8,678,776 B2 * | 3/2014 | Medow | ............. | B25J 15/0625 417/53 |
| 8,863,608 B2 * | 10/2014 | Fischer | ............. | B25J 9/142 74/490.04 |
| 9,339,936 B2 * | 5/2016 | Kearney | ............. | B65G 47/91 |
| 9,616,582 B2 * | 4/2017 | Holecek | ............. | B25J 15/0616 |
| 9,707,686 B2 * | 7/2017 | Dunkmann | ............. | F04F 5/52 |
| 9,808,938 B2 * | 11/2017 | Mast | ............. | B25J 15/0616 |
| 9,950,907 B2 * | 4/2018 | Moore | ............. | B66C 1/0256 |
| 9,987,757 B2 * | 6/2018 | Holecek | ............. | F04F 5/52 |
| 10,059,533 B2 * | 8/2018 | Wigren | ............. | B66C 1/0268 |
| 2002/0096815 A1 * | 7/2002 | Dachtler | ............. | B65H 3/0816 271/3.11 |
| 2007/0241575 A1 * | 10/2007 | Lundin | ............. | B66C 1/0212 294/183 |
| 2009/0108605 A1 * | 4/2009 | Becker | ............. | B25J 9/142 294/198 |
| 2010/0303641 A1 * | 12/2010 | Medow | ............. | B25J 15/0625 417/188 |
| 2012/0025053 A1 * | 2/2012 | Tell | ............. | B25J 15/0616 248/363 |
| 2012/0210818 A1 * | 8/2012 | Fischer | ............. | B25J 9/142 74/490.04 |
| 2013/0152724 A1 * | 6/2013 | Mozeika | ............. | B25J 17/00 74/490.05 |
| 2015/0017025 A1 * | 1/2015 | Holecek | ............. | F04F 5/52 417/54 |
| 2015/0052990 A1 | 2/2015 | Dunkmann et al. | | |
| 2016/0059425 A1 * | 3/2016 | Andersen | ............. | B65G 47/91 294/185 |
| 2016/0075537 A1 * | 3/2016 | Lundin | ............. | B66C 1/0212 700/228 |
| 2016/0096278 A1 * | 4/2016 | Cho | ............. | F16B 47/00 294/185 |
| 2016/0136821 A1 * | 5/2016 | Vaughn | ............. | B25J 15/0625 294/183 |
| 2016/0263751 A1 * | 9/2016 | Galloway | ............. | B25J 15/0023 |
| 2016/0297079 A1 * | 10/2016 | Mast | ............. | B25J 15/0616 |
| 2017/0073175 A1 * | 3/2017 | Wicks | ............. | B65G 61/00 |
| 2017/0087718 A1 * | 3/2017 | Wagner | ............. | B25J 15/0683 |
| 2017/0265392 A1 * | 9/2017 | Van De Vegte | ....... | A01G 18/00 |
| 2018/0071922 A1 * | 3/2018 | Vaughn | ............. | B25J 15/0625 |

FOREIGN PATENT DOCUMENTS

| | | | |
|---|---|---|---|
| EP | 0373841 A2 * | 6/1990 | |
| EP | 2522471 A1 | 11/2012 | |
| SU | 1324981 A1 * | 7/1987 | |
| WO | 2005111433 A1 | 11/2005 | |
| WO | 2008098589 A1 | 8/2008 | |
| WO | 2009080170 A1 | 7/2009 | |

OTHER PUBLICATIONS

Non-translated German Office Action dated Mar. 28, 2019, pp. 1-6.

* cited by examiner

METHOD FOR MONITORING FUNCTIONAL STATES A PRESSURE DRIVEN ACTUATOR AND PRESSURE-ACTUATABLE ACTUATOR

CROSS-REFERENCE TO RELATED APPLICATIONS

This application relates and claims priority to European Application No. 16168786.8-1807, filed May 9, 2016, the entire disclosure of which is incorporated herein by reference.

BACKGROUND OF THE INVENTION

The invention relates to a method for monitoring functional states of a pressure-driven actuator, and to a pressure-drivable actuator.

One field of application concerns vacuum-driven actuators, e.g. vacuum pick-up devices, expansion bellows or vacuum tube lifters comprising vacuum lifting tubes, as described e.g. in WO 2005/110907 A1 or U.S. Pat. No. 4,413,853 A. Another field of application concerns overpressure-driven actuators, e.g. pneumatic or hydraulic actuators or manipulators.

Actuators of this type have in common that pressure is applied to a flexibly deformable actuator compartment in order to actuate the actuator. In this case, in principle this may relate to overpressure (for overpressure-driven actuators) or a vacuum (for vacuum-driven actuators). Pressure is applied to the actuator compartment in particular by means of a working fluid, which is provided by an operating pressure supply (e.g. a pressure source, vacuum pump, ejector or the like). The working fluid may in principle have an overpressure or a vacuum relative to the surroundings. The working fluid may e.g. be a hydraulic fluid or a compressed gas, such as compressed air. The present invention relates in particular to pneumatic actuators using air as the working fluid.

Said actuators are usually intended to be integrated in more complex handling processes or production processes in which an object needs to be e.g. lifted, gripped, clamped, processed or handled in another way. In particular, automated processes are desired. This makes it possible for the individual functional units to be operated as required and such that they are coordinated with one another.

To do this, the functional state of an actuator is intended to be monitored during its operation. In particular, functional data is intended to be determined which represent the functional state and e.g. relate to the current operating state, configuration, load state or the like of the actuator.

There are many different factors influencing this characteristic information. First of all, the mechanical properties of the actuators may change over time, e.g. due to ageing or wear of the materials used. Likewise, the hydromechanical properties of the working fluid may change over time. In addition, the current functional state of an actuator itself has an influence on the measurable characteristic variables. For example, the current compression state of the actuator compartment and/or the current deformation state of the actuator compartment influences the response of said compartment when a pressure change is applied.

In order to obtain reliable and significant information regarding the functional states of the individual units in a more complex system, it is known to assign sensors that monitor various properties to each of the various pressure-drive or pressure-controlling units. For example, a supply pressure of a vacuum pick-up device can be monitored (e.g. DE 10 2014 206 308 A1) or the compressed supply air fed to a compressed-air-driven ejector can be monitored (e.g. WO 2013 120801 A1). It is also known to use sensors to monitor when the relevant starting configurations or end configurations of an actuator have been reached. In order to monitor various types of functional state, a plurality of sensors comprising associated data communication and control are required, and this can lead to increased structural complexity and increased susceptibility to errors.

SUMMARY OF THE INVENTION

The problem addressed by the present invention is that of making it possible to reliably monitor functional states of a pressure-driven actuator in a structurally simple manner.

This problem is solved by a method for monitoring functional states of a pressure-driven actuator according to claim 1. The problem is accordingly also solved by a method for operating a driven actuator, which method has the method features that are set out in claim 1 and are explained in greater detail in the following.

The method is carried out using an actuator that is pressure-driven and comprises an actuator compartment that is flexibly deformable. For this purpose, the actuator compartment is defined at least in part by a flexible wall. In particular, the wall is flexibly and elastically deformable.

In order to operate the actuator, pressure (overpressure or a vacuum) is applied to the actuator compartment. The pressure driving the actuator is provided by an operating pressure supply.

According to the method, a work process is carried out to actuate the actuator, the work process being accompanied by the actuator transitioning from a starting configuration to an end configuration. This transition is brought about by pressure being applied to the actuator compartment. The transition from the starting configuration to the end configuration is associated with deformation of the actuator compartment, in particular with deformation of the flexible wall of the actuator compartment.

A sensor apparatus designed to measure the pressure applied to the actuator compartment is used to monitor the functional state. During the transition from the starting configuration to the end configuration, i.e. during the work process, the sensor apparatus is used to measure the pressure applied to the actuator compartment depending on time. For this purpose, the sensor apparatus can in particular measure the pressure prevailing in the actuator compartment. It is also conceivable to measure the pressure in an inlet into the actuator compartment by means of which a connection to the operating pressure supply is established.

It is made possible to monitor functional states by the pressure applied to the actuator compartment not being solely determined by the operating pressure supply. Instead, the progression of the pressure over time for the actuator compartment when an operating pressure supply is provided is influenced in many ways, for example by material properties, by the current configuration of the actuator (e.g. volume of the actuator compartment to which pressure is applied, deformation state of the actuator compartment, deformation state or compression state of the walls defining the actuator compartment) and by the load state acting on the actuator (e.g. due to the weight of an object resting thereon). Since the actuator compartment is defined at least in part by flexibly deformable walls, the mechanical properties of the walls and thus the deformation of the actuator compartment can change comparatively significantly depending on pressure. This means that, in this type of actuator having flexible walls, a characteristic dependency of the pressure applied to the actuator compartment on the functional states is produced.

On the basis of the measured values of the pressure applied to the actuator compartment at different times, conclusions can therefore be drawn on the functional state and load state of the actuator. Functional data can then be determined by means of the measured results from the sensor.

The functional data determined represent the functional state. In this case, the functional state and the functional data may relate to different information. In the following, examples of this information are given:
- current operating state of the actuator, e.g. contracted and extended state (e.g. final-position state of a drive actuator), pick-up state or release state (e.g. a vacuum pick-up device);
- current configuration and/or deformation of the actuator or the walls defining the actuator compartment, e.g. compression of a pressure chamber, degree of elastic deformation (e.g. of a bellows actuator or of a deformable vacuum aspirator);
- current load state of the actuator, e.g. due to a weight force or inertial force of an object actuated (e.g. picked up, handled) by the actuator; in particular also detecting the presence or absence of an object to be actuated;
- current wear state of the actuator, e.g. altered material properties such as rigidity or elasticity owing to material fatigue (e.g. in bellows, vacuum lifting tubes or vacuum pick-up devices), altered coefficients of friction of material portions rubbing against one another; in addition, wear can lead to a change in the seal quality of an overpressure-driven or vacuum-driven actuator.

Using the method, various types of information can be determined using just one sensor apparatus (e.g. just one pressure sensor). In comparison with systems comprising complex sensor apparatuses comprising a plurality of sensors, the susceptibility to errors can be reduced. The functional data determined can be used to actuate the actuator as required. In particular, it is possible to control the operating pressure supply depending on the progression of the measured pressure over time. If the actuator is a vacuum pick-up device, for example, the optimal force for the type of object in question can be exerted during the pick-up process (work process) for the desired handling. For delicate objects, surface damage and deformation can thus be prevented. Furthermore, monitoring the progression of the pressure over time makes it possible to monitor and evaluate the work process. For example, it can be determined from the characteristics of the progression of the pressure whether, when the actuator is a vacuum pick-up device, an object has been picked up as intended, how heavy this object is and/or how large this object is.

In principle, conclusions can also be drawn on the functional state from measurements of other fluidic parameters. In this respect, it is conceivable in principle for a volumetric flow flowing into the actuator compartment and/or out of the actuator compartment to be measured. Measured data of this type can also be used to determine functional data with regard to said properties.

In particular, it is advantageous for the work process to be carried out under the effect of a load, as is the case when the actuator is operated as intended. In this respect, the measurement is taken during the actual work process of the actuator, for example while an object is being handled or while a device is being driven by means of the actuator. In this respect, it is not necessary to interrupt the intended use in order to monitor the functional state.

In order to be able to reliably monitor the change in the measured pressure over time, according to an advantageous embodiment, the volumetric flow of working fluid provided by the operating pressure supply can be adjusted to the size and/or the mechanical properties of the actuator compartment. For this purpose, it may be provided that a throttle valve, flow resistor, flow screen or the like is connected between the operating pressure supply and the actuator compartment. This means that the volumetric flow can be reduced and the change in the pressure over time can be slowed. As a result, the change in the pressure over time can be prevented from being too rapid and the monitoring can be prevented from being imprecise.

According to a particularly advantageous embodiment of the method, a characteristic curve representing the progression of the pressure over time during the work process is determined. In particular, the characteristic curve is stored in a storage apparatus. The plotted characteristic curve allows various conclusions to be drawn on influencing factors and thus on the functional state. In particular, there are various influences on different regions of the characteristic curve, for example at different pressure levels and/or at different times. Over the characteristic curve, for example a change in the material properties of the actuator (e.g. due to ageing processes and/or wear processes) may differ from a load on the actuator (e.g. due to the weight force of an object). This applies in particular to actuators comprising an actuator compartment defined by flexible walls (at least in part). Since the mechanical properties of the walls change with the deformation state, the progression of the pressure over time at the start of the work process is different from the progression of the pressure over time at the end of the work process in a characteristic manner. Different functional states therefore lead to easily distinguished characteristic curves.

A simple method is therefore made possible in that it is not a continuous characteristic curve that is determined, but instead the pressure measured at specified time intervals from the start of the work process is compared with distinct reference values stored in a storage apparatus, and/or the deviation from the stored reference values is determined.

According to another aspect, although a continuous characteristic curve is determined and plotted, only a specified number of points on the characteristic curve are compared with a corresponding number of reference values for distinct reference times (measured from the start of the work process), and/or the deviation from the reference values is determined. It may be sufficient to monitor the characteristic curve at distinct, specified points since various influences (material ageing, load, deformation or the like) typically influence characteristic regions of the characteristic curve.

Precise monitoring is made possible in that the determined characteristic curve is compared with a reference characteristic curve stored in a storage apparatus, and/or the deviation from the reference characteristic curve is determined. Various functional states can be determined from the deviations from the reference characteristic curve, as explained in greater detail in the following.

Advantageously, the method can further be developed into an operating method for the actuator. For this purpose, it may in particular be provided that the operating pressure supply and/or the application of pressure to the actuator compartment is controlled such (e.g. by means of a valve apparatus arranged upstream) that the pressure applied to the actuator compartment corresponds to a respectively predefined target value in clearly specified time intervals (measured from the start of the work process). It is also conceivable for this control to be implemented such that the deviation from the respectively predefined target value is at most a tolerance deviation.

In particular, control may also be carried out such that the measured pressure (and/or the determined characteristic curve) substantially follows a desired target characteristic curve. In particular, control may also be implemented such that the measured characteristic curve representing the pressure during the work process extends within a tolerance corridor around the target characteristic curve.

In order to obtain comparable data, it is preferably provided that, in order to actuate the actuator when carrying out the work process, the operating pressure supply provides a previously specified output and/or a previously specified volumetric flow of working fluid. As a result, a reproducible operating pressure supply is provided and comparable measurements are ensured.

For further development, a reference characteristic curve can be determined in a calibration process. The calibration process is carried out in addition to the work process, in particular after a specified number of work processes that have been carried out, or immediately upon initial operation of the actuator in a superordinate system. In the calibration process, it is in particular provided that a specified and reproducible load is applied to the actuator, for example under the effect of a specified and reproducible force. This may be a neutral state, e.g. an idle state without load in an overpressure-driven drive as the actuator. In the calibration process, it is also in particular provided that the operating pressure supply provides a specified output and/or a specified volumetric flow of working fluid. Similarly to the work process, the calibration process is distinguished in that the actuator transitions from the starting configuration to the end configuration. During the transition, the time dependency of the pressure applied to the actuator compartment is determined in the form of a reference characteristic curve representing the progression of the pressure over time and is stored in a storage apparatus.

To further develop the method, functional data are determined in each case from the pressure measured depending on time. This may preferably take place in a controller. The functional data represent the functional state of the actuator. For example, the information mentioned at the outset can be determined as functional data from the progression of a characteristic curve, the magnitude of deviations from reference values and/or the magnitude of deviations of a measured characteristic curve from a reference characteristic curve.

In particular, it is advantageous for a load due to a force acting on the actuator to be determined from the time dependency of the measured pressure. If this is a lifting actuator (e.g. a vacuum tube lifter), for example, the weight (or weight force) of an object being handled can be determined.

To further develop the method, it is provided that a plurality of work processes are carried out in succession. The work processes are in particular repeated cyclically, i.e. the actuator is transferred back into the starting configuration once it reaches the end configuration. For example, determined characteristic curves may be averaged. It is also conceivable to carry out a calibration process after specified times and/or after a specified number of work processes, as explained above.

The problem stated at the outset is also solved by a pressure-driven actuator (or a pressure-drivable actuator, i.e. one that can be driven by means of pressure). The actuator is designed such that it can be operated by applying pressure (overpressure or a vacuum) to an actuator compartment, the actuator transitioning from a starting configuration into the end configuration by pressure being applied thereto (work process). The actuator compartment is defined by flexibly deformable walls. In particular, the wall is elastically deformable. During the transition from the starting configuration to the end configuration, the walls deform. In accordance with the method explained above, a sensor apparatus is provided which is designed to measure a pressure applied to the actuator compartment in a time-dependent manner. The sensor apparatus may in particular be a pressure sensor in the actuator compartment or in an inlet into the actuator compartment.

To further develop the actuator, a controller that interacts with the sensor apparatus may be provided which is designed and/or programmed to carry out a method for monitoring functional states of the actuator, as explained above. The controller may for example be integrated in a microcontroller of the sensor. In particular, a computer program may be stored in the controller, which actuates the controller in order to carry out the method described above.

The controller may also be designed to actuate the operating pressure supply of the actuator depending on the measured pressure. As explained, the operating pressure supply may in particular be controlled such that a measured characteristic curve is kept within a desired tolerance corridor around a target characteristic curve.

As explained at the outset, the pressure-driven actuator may in principle be any type of actuator that can be operated by applying pressure to an actuator compartment. For example, the actuator may be designed as an overpressure-driven or vacuum-driven actuator.

An advantageous field of application is in particular actuators that are designed as vacuum pick-up devices in which a suction compartment forms said actuator compartment. A vacuum can be applied to the suction compartment in order to pick up an object. In particular, the vacuum pick-up device comprises a contact surface comprising a suction opening that communicates with the suction compartment. The contact surface comprising the suction opening is brought into contact with the object in order to pick up said object.

Another advantageous field of application involves the actuator being designed as a vacuum tube lifter. A vacuum tube lifter comprises a vacuum lifting tube comprising a tube interior forming the actuator compartment. The vacuum lifting tube is designed as a flexibly deformable wall such that the vacuum lifting tube is shortened by a vacuum applied to the tube interior, i.e. said tube can be transferred from an extended starting configuration into a contracted end configuration. In vacuum tube lifters of this type, the weight of an object lifted by the vacuum tube lifter can advantageously be determined from the characteristic curve.

A particularly advantageous field of application relates to what are known as fluidic elastomer actuators. Said actuators comprise flexible elastomer walls that enclose the actuator compartment. The actuator compartment in particular comprises an inlet in order to supply and remove working fluid. Preferably, the actuator compartment is also sealed from the surroundings by the elastomer wall. By means of the fluidic elastomer actuator, an object may for example be manipulated by the pressure-induced transition from the starting configuration to the end configuration.

BRIEF DESCRIPTION OF THE DRAWINGS

The invention is explained in greater detail in the following with reference to the drawings, in which.

Figure 1:
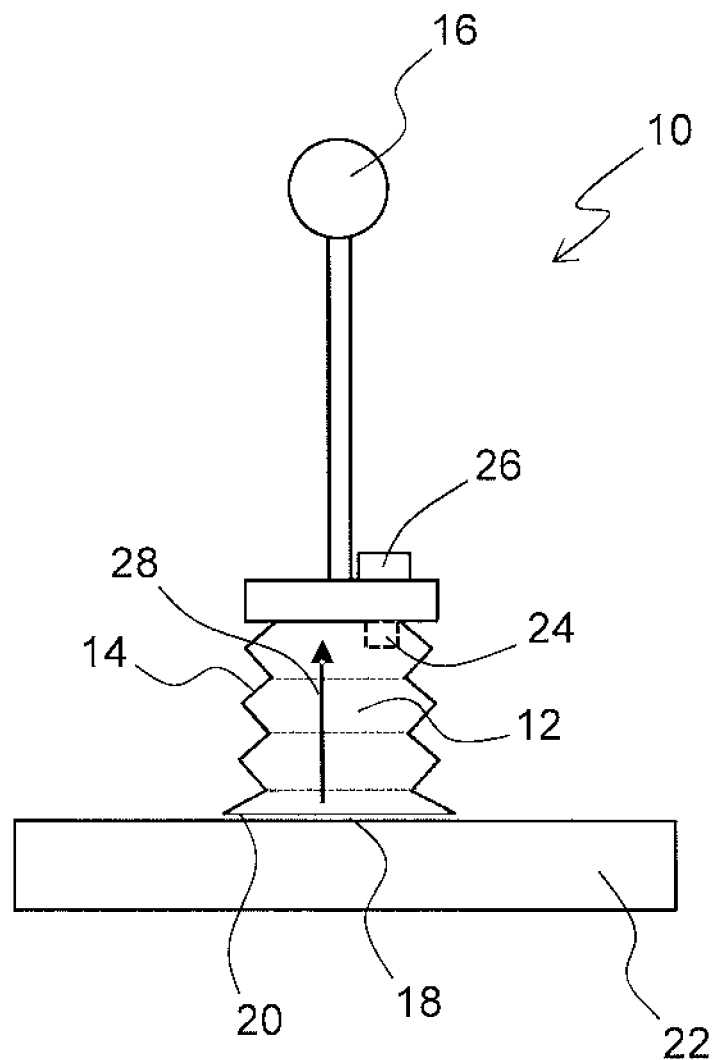
FIG. 1 is a schematic view of an actuator according to the invention for carrying out a method according to the invention.

In the following description and in the drawings, the same reference signs are used in each case for identical or corresponding features.

DETAILED DESCRIPTION

FIG. 1 is a schematic view of a pressure-driven actuator 10. The actuator 10 is only designed as a vacuum pick-up device by way of example. The actuator comprises an actuator compartment 12 defined by a flexibly deformable wall 14. In the example shown, the flexibly deformable wall is designed as a flexibly deformable bellows 14.

In order for pressure to be applied to the actuator compartment 12, the actuator compartment 12 is in a pressure connection and/or flow connection with an operating pressure supply 16.

The actuator 10, which is designed as a vacuum pick-up device in FIG. 1, comprises a contact surface 18 comprising a suction opening 20 that communicates with the actuator compartment 12. In order to pick up an object 22, the contact surface 18 comprising the suction opening is brought into contact with the object 22 and a vacuum is applied to the actuator compartment 12.

However, actuators comprising other types of actuator compartment 12 can also be used in principle, for example a vacuum lifting tube as an actuator, the actuator compartment 12 being surrounded by a vacuum lifting tube wall (e.g. a corresponding wall 14). In the same way, the actuator 10 can be designed as a fluidic elastomer actuator that changes its shape when pressure is applied thereto.

In order to operate the actuator 10, pressure is applied to the actuator compartment 12. If this is a vacuum-operated actuator, as in FIG. 1, a vacuum is applied to the actuator compartment 12 relative to the surroundings.

The actuator 10 comprises a sensor apparatus 24 (here, a pressure sensor), which is designed to measure the pressure applied to the actuator compartment 12. The actuator 10 may also comprise a controller 26 (see FIG. 1), which interacts with the sensor apparatus 24 such that the pressure applied to the actuator compartment 12 can be measured in a time-dependent manner. In particular, the actuator 10 may comprise a storage apparatus, for example as a component of the controller. Measured data can be stored in the storage apparatus.

The functional state of the actuator 10 can be monitored while a work process is being carried out. In order to carry out the work process, pressure (a vacuum in the example shown) is applied to the actuator compartment 12 by the operating pressure supply 16. This means that the actuator transitions from a starting configuration to an end configuration. In the example in FIG. 1, the starting configuration is an extended configuration of the flexibly deformable wall 14, as shown in FIG. 1. When evacuating the actuator compartment 12, the configuration of the actuator 10 (more precisely, the configuration of the wall 14 or the bellows 14 in FIG. 1) changes due to compression in the compression direction 28. The end configuration is reached when the bellows 14 is completely contracted according to its material properties and geometric properties. In this respect, the transition from the starting configuration to the end configuration is accompanied by deformation of the flexible wall 14.

By means of the sensor apparatus 24, the pressure applied to the actuator compartment 12 or the pressure prevailing in the actuator compartment 12 is measured depending on time from the start of the work process, i.e. from the beginning of the transition from the starting configuration to the end configuration. The progression of the pressure over time may be recorded in the form of a characteristic curve representing the dependency of the pressure on time, and for example may be stored in the controller 26 or a storage device.

Figure 2:
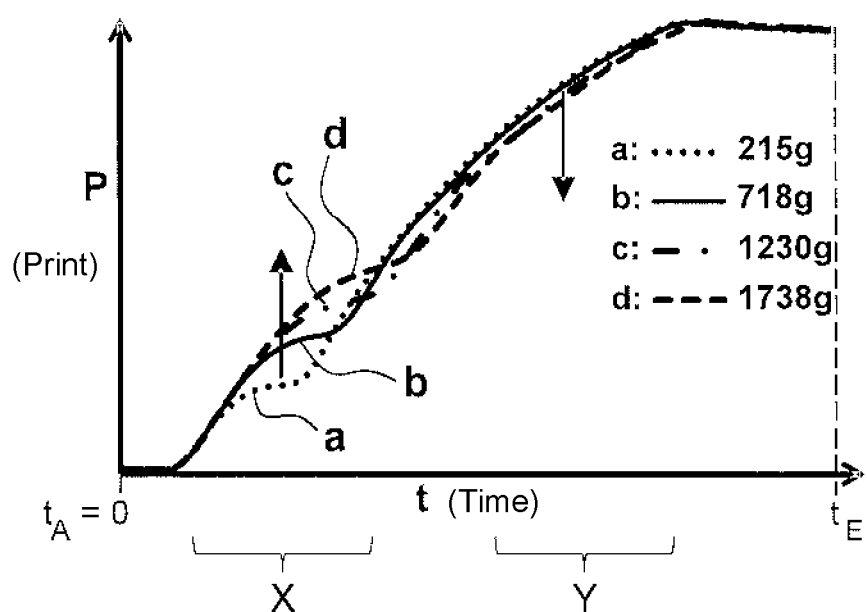
FIG. 2 is an example of characteristic curves for various operating conditions of the actuator.
Figure 3:
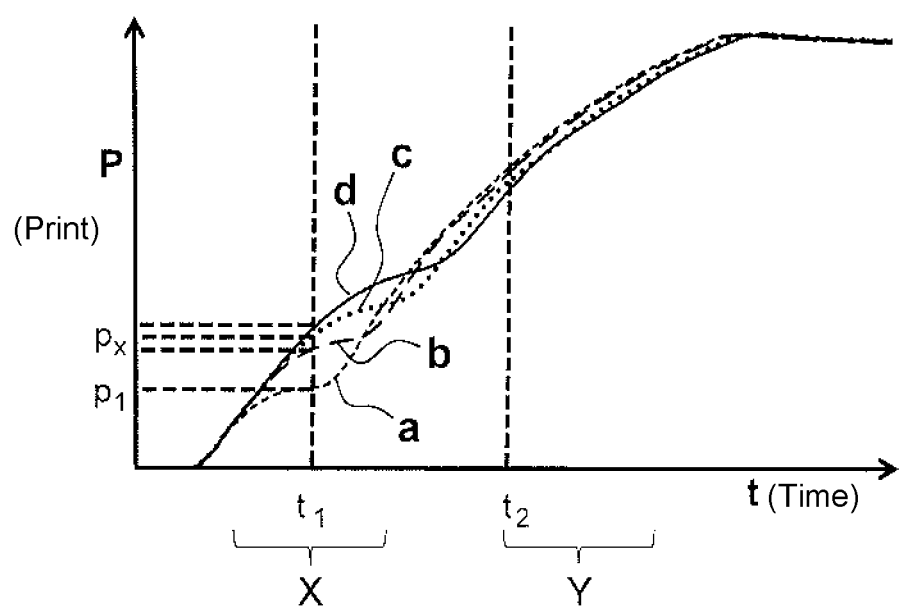
FIG. 3 is an example showing the comparison with reference values at specified reference times.
Figure 4:
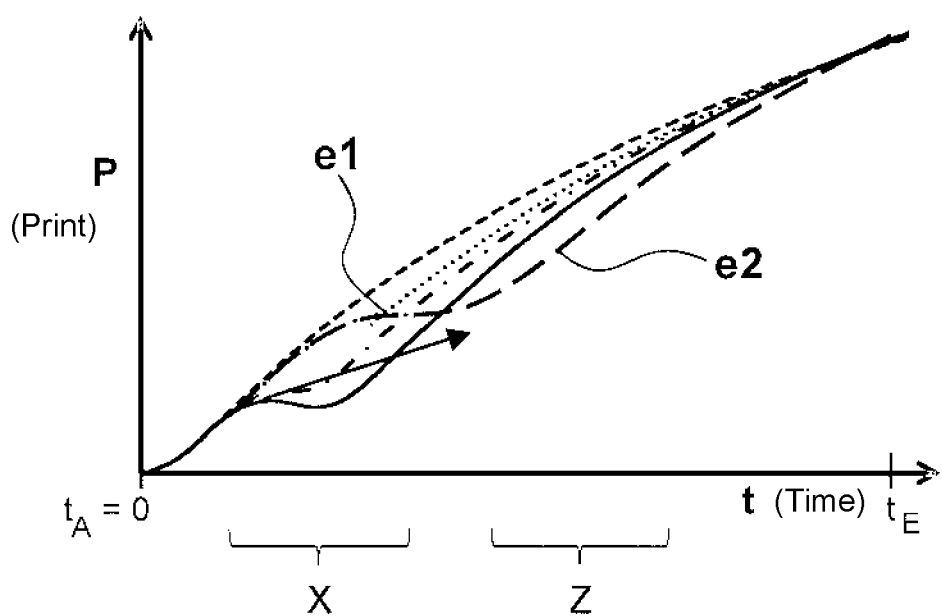
FIG. 4 is an example showing further influencing factors on the characteristic curves.

FIGS. 2 to 4 show different characteristic curves and the influences of different operating states of the actuator 10 on the characteristic curves.

For example, FIG. 2 shows characteristic curves of the pressure applied to the actuator compartment 12 for different work processes. Here, each work process begins at the time tA = 0 and ends at the time tE.

For example, the operating pressure supply 16 can be actuated such that it provides a constant output throughout the entire work process. Here, the time tE marks the end of the work process, which is defined by reaching the end configuration of the actuator.

The various work processes to which the various characteristic curves are assigned in FIG. 2 differ by way of example on account of the mass of the object 22 picked up by the actuator 10. Different masses of the object 22 lead to different load states for the actuator 10. In the example shown in FIG. 1, different load states correspond to different weight forces, which counteract a transition of the actuator compartment 12 from the starting configuration to the end configuration on account of the object 22 picked up.

As can be seen in FIG. 2, the work process has portions X and Y (and thus there are different regions of the progression of the characteristic curves) in which the characteristic curves deviate from one another for different load states (here, masses of the object 22) in a characteristic manner. By way of example, characteristic curves a, b, c, d are plotted for the different masses.

This makes it possible to determine to which load state the actuator 10 is subjected by analysing the progression of a plotted characteristic curve. A functional state, e.g. the mass of the object picked up, can be determined in this case by measuring the characteristic curve.

Since the characteristic curves deviate from one another in the characteristic portions X and Y for different load states, it may be sufficient not to evaluate the different characteristic curves over the entire work process, but only at set, distinct reference times t1 and t2. This is shown in FIG. 3. The functional state of interest (here, the mass of the object 22) can also be determined on the basis of the characteristic progression in portions X and Y from the values of the characteristic curves at the times t1 and t2. In the example in FIGS. 2 and 3, this means that the characteristic curves a, b, c, d (see FIG. 2) may already differ at the reference times t1 and t2 by the characteristic values.

By measuring the pressure applied to the actuator compartment 12 depending on time, various types of information regarding the functional state of the actuator 10 can be determined. For this purpose, the fact that various influencing factors often influence various characteristic regions of the characteristic curves can be utilised. This is shown in FIG. 4. This figure shows a range of different characteristic curves for different load states of the actuator due to different weight forces. As explained on the basis of the example in FIG. 2, the characteristic curves deviate from one another in a characteristic manner in a portion X of the work processes depending on the load due to weights.

In FIG. 4, the two characteristic curves denoted by e1 and e2 correspond to a load state having an identical weight or mass. In this respect, the characteristic curves e1 and e2 substantially correspond in said region X.

In the case of FIG. 4, however, the characteristic curves e1 and e2 are incorporated in two functional states of the actuator 10, which differ in terms of the degree of deformability of the actuator compartment 12. The degree of deformability is influenced by the configuration of the flexibly deformable wall 14, for example. If this is a bellows 14, for example, compression may take place together with deformation until a compressed state of the material is reached in which the individual folds are in contact with one another. In the same way, material fatigue or material wear may lead to a change in the mechanical properties and thus to altered deformation behaviour. As can be seen in FIG. 4, the characteristic curves e1 and e2 differ in a characteristic portion Z of the work process which deviates from the portion X.

Overall, information regarding the load state of the actuator and at the same time also information regarding the degree of deformability or regarding potential material fatigue can be determined by analysing the characteristic curves both in portion X and portion Z.

The characteristic curves may for example be stored and evaluated in the controller 26 as a data set. As explained at the outset, the evaluation may for example include a comparison with a reference characteristic curve. Functional data that characterise the functional state of the actuator can then be determined from the characteristic curves or values of the characteristic curve at specified reference times. For this purpose, the controller 26 may comprise a correspondingly configured evaluation unit comprising a processor.

Figure 5:
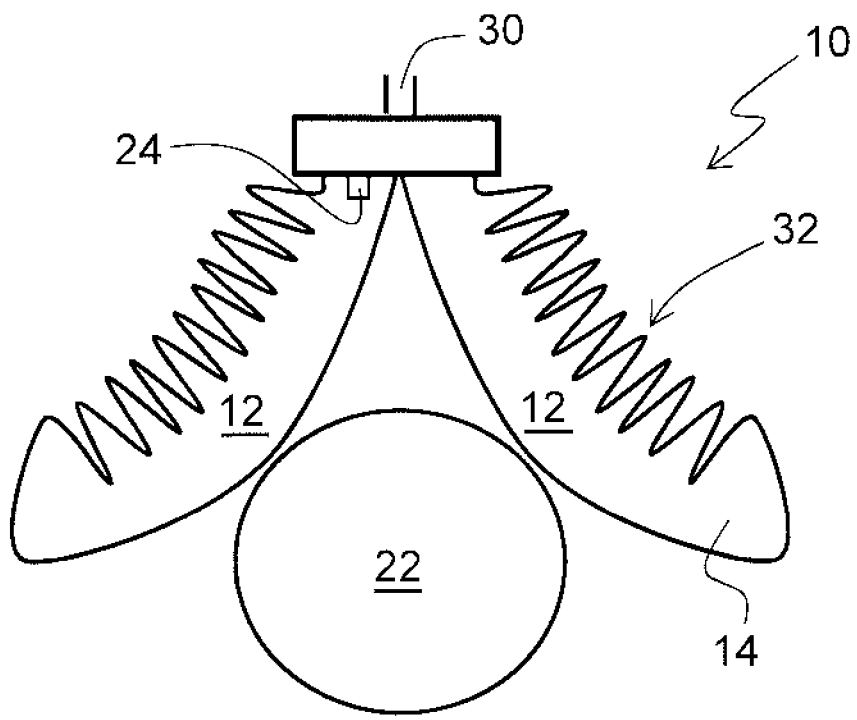
FIG. 5 is another embodiment of an actuator according to the invention in its starting configuration.
Figure 6:
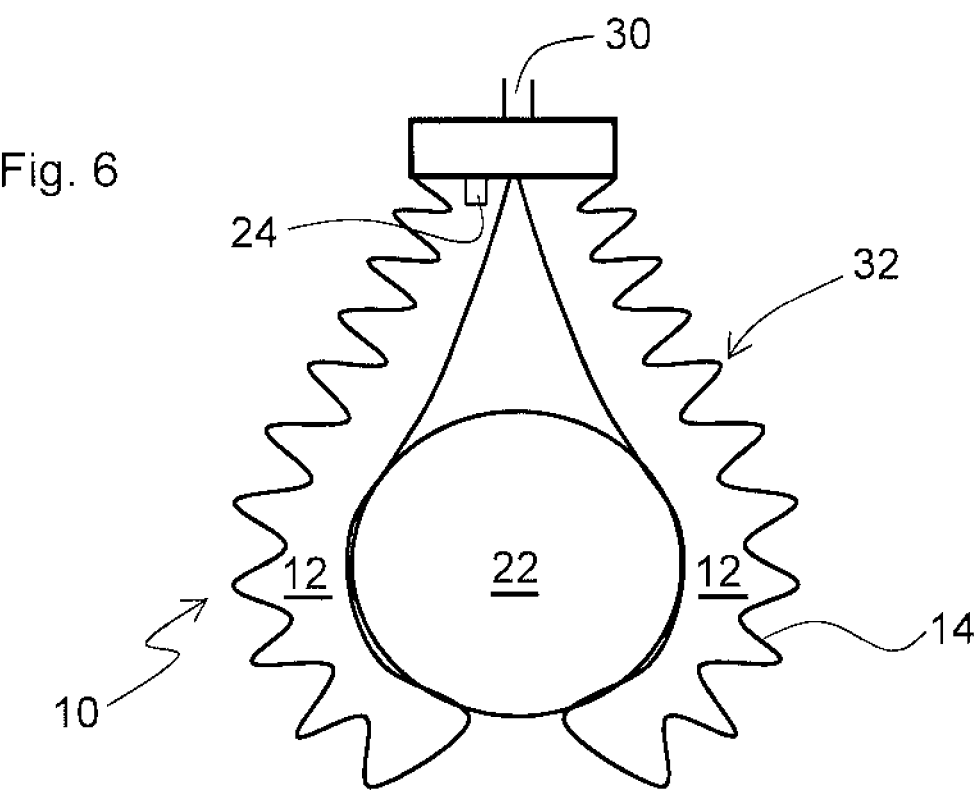
FIG. 6 shows the actuator according to FIG. 5 in its end configuration.

FIGS. 5 and 6 show another advantageous field of application. Here, the actuator 10 is designed as a fluidic elastomer actuator. Said actuator comprises an actuator compartment 12 surrounded by a wall 14 made of an elastomer. Working fluid can be supplied to the actuator compartment 12 through an inlet 30. In the example shown, the actuator comprises two finger-like portions that are preferably each completely enclosed by the wall 14 relative to the surroundings (except for the inlet 30). A specified and/or defined region 32 of the wall 14 may be formed so as to be folded (cf. FIG. 5).

FIG. 5 shows the actuator 10 in its starting configuration. When pressure is applied to the actuator compartment 12, the flexibly deformable wall 14 of the actuator 10 expands. This results in the shape of the actuator 10 changing. If e.g. a specified region 32 of the wall 14 is formed so as to be folded, when pressure is applied thereto, the folded region 32 expands to a greater extent than the rest of the regions of the flexibly deformable wall 14. As a result, the fluidic elastomer actuator 10 assumes an end configuration as shown in FIG. 6. The end configuration differs from the starting configuration in terms of its overall geometry. This can be utilised to pick up an object 22. In the example shown, the finger-like portions of the actuator 10 enclose the object 22 in the end configuration (cf. FIG. 6).

What is claimed is:

1. Method for operating a pressure-driven actuator which comprises an actuator compartment defined at least in portions by a flexibly deformable wall, the actuator being actuated by applying pressure to the actuator compartment by means of an operating pressure supply,
   a work process being carried out to actuate the actuator, which process is accompanied by the actuator transitioning from a starting configuration to an end configuration,
   characterised in that the pressure is measured depending on time by means of a sensor apparatus for measuring the pressure applied to the actuator compartment during the transition from the starting configuration to the end configuration, a characteristic curve (a, b, c, d) representing the progression of the pressure over time during the work process being determined and being stored in a storage apparatus,
   wherein the determined characteristic curve is compared with a reference characteristic curve stored in the storage apparatus, and/or the deviation from the reference characteristic curve is determined,
   wherein functional data which represent a functional state of the actuator are determined from the progression of the characteristic curve and/or the deviations from the reference characteristic curve, and wherein different functional data which represent different functional state of the actuator are determined from the different regions of the characteristic curve,
   and wherein the operating pressure supply is controlled depending on the functional data.

2. Method according to claim 1, characterised in that the pressure is only measured at specified time intervals (t1; t2) from the start of the work process and is compared with reference values stored in a storage apparatus, and/or the deviation from the reference values is determined.

3. Method according to claim 1, characterised in that the pressure is continuously measured and the characteristic curve is compared with a specified and limited number of pressure reference values for distinct reference times (t1;t2), and/or the deviation from the reference values is determined.

4. Method according to claim 1, characterised in that the operating pressure supply is controlled and/or the application of pressure to the actuator compartment is controlled such that the pressure applied to the actuator compartment corresponds to a target value predefined in each case at specified time intervals from the start of the work process, or in that the deviation from the target value predefined in each case is at most a predefined tolerance deviation.

5. Method according to claim 1, characterised in that the operating pressure supply provides a specified output and/or a specified volumetric flow of working fluid in order to actuate the actuator to carry out the work process.

6. Method according to claim 1, characterised in that, in addition to the work process, a calibration process is carried out in which a specified and reproducible load is applied to the actuator and the operating pressure supply provides a specified output and/or a specified volumetric flow of working fluid, the actuator transitioning from the starting configuration to the end configuration, and the time dependency of the pressure being determined in the form of a reference characteristic curve representing the progression of the pressure over time and being stored in a storage apparatus.

7. Method according to claim 1, characterised in that a force acting on the actuator as a load is determined from the progression of the measured pressure over time.

8. Method according to claim 1, characterised in that a plurality of work processes are cyclically repeated and are carried out in succession.

9. Pressure-driven actuator which comprises an actuator compartment defined at least in portions by a flexibly deformable wall such that the actuator can be actuated by applying pressure to the actuator compartment, the actuator transitioning from a starting configuration into an end configuration under deformation of the flexibly deformable wall, characterised in that a sensor apparatus is provided for the time-dependent measurement of the pressure applied to the actuator compartment, wherein a controller is provided which comprises means for:
- carrying out a work process to actuate the actuator, which process is accompanied by the actuator transitioning from the starting configuration to the end configuration,
- wherein the pressure is measured depending on time by means of the sensor apparatus for measuring the pressure applied to the actuator compartment during the transition from the starting configuration to the end configuration,
- determining a characteristic curve (a, b, c, d) representing the progression of the pressure over time during the work process and storing the characteristic curve in a storage apparatus,
- wherein the determined characteristic curve is compared with a reference characteristic curve stored in the storage apparatus, and/or the deviation from the reference characteristic curve is determined,
- wherein functional data which represent a functional state of the actuator are determined from the progression of the characteristic curve and/or the deviations from the reference characteristic curve, and wherein different functional data which represent different functional state of the actuator are determined from the different regions of the characteristic curve,
- and wherein the operating pressure supply is controlled depending on the functional data.

10. Pressure-driven actuator according to claim 9, wherein the actuator is a vacuum pick-up device comprising a suction compartment forming the actuator compartment, to which a vacuum can be applied in order to pick up an object.

11. Pressure-driven actuator according to claim 9, wherein the actuator is a vacuum tube lifter comprising a tube interior of a vacuum lifting tube forming the actuator compartment, wherein the vacuum lifting tube can be transferred from an extended starting configuration into a contracted end configuration by means of a vacuum being applied to the tube interior.

12. Method for operating monitoring a functional state of a pressure-driven actuator which comprises an actuator compartment defined at least in portions by a flexibly deformable wall, the actuator being actuated by applying pressure to the actuator compartment by means of an operating pressure supply,
- a work process being carried out to actuate the actuator, which process is accompanied by the actuator transitioning from a starting configuration to an end configuration, characterised in that the pressure is measured depending on time by means of a sensor apparatus for measuring the pressure applied to the actuator compartment during the transition from the starting configuration to the end configuration, a characteristic curve (a, b, c, d) representing the progression of the pressure over time during the work process being determined and being stored in a storage apparatus,
- wherein the determined characteristic curve is compared with a reference characteristic curve stored in the storage apparatus, and/or the deviation from the reference characteristic curve is determined,
- wherein functional data which represent a functional state of the actuator are determined from the progression of the characteristic curve and/or the deviations from the reference characteristic curve, wherein the functional data represent a weight of an object actuated by the actuator, and wherein the operating pressure supply is controlled depending on the functional data.

13. Method for operating monitoring a functional state of a pressure-driven actuator which comprises an actuator compartment defined at least in portions by a flexibly deformable wall, the actuator being actuated by applying pressure to the actuator compartment by means of an operating pressure supply,
- a work process being carried out to actuate the actuator, which process is accompanied by the actuator transitioning from a starting configuration to an end configuration, characterised in that the pressure is measured depending on time by means of a sensor apparatus for measuring the pressure applied to the actuator compartment during the transition from the starting configuration to the end configuration, a characteristic curve (a, b, c, d) representing the progression of the pressure over time during the work process being determined and being stored in a storage apparatus,
- wherein the determined characteristic curve is compared with a reference characteristic curve stored in the storage apparatus, and/or the deviation from the reference characteristic curve is determined,
- wherein functional data which represent a functional state of the actuator are determined from the progression of the characteristic curve and/or the deviations from the reference characteristic curve, wherein the functional data represent a current wear state of the actuator,
- and wherein the operating pressure supply is controlled depending on the functional data.

14. Method for operating monitoring a functional state of a pressure-driven actuator which comprises an actuator compartment defined at least in portions by a flexibly deformable wall, the actuator being actuated by applying pressure to the actuator compartment by means of an operating pressure supply,
- a work process being carried out to actuate the actuator, which process is accompanied by the actuator transitioning from a starting configuration to an end configuration,
- characterised in that the pressure is measured depending on time by means of a sensor apparatus for measuring the pressure applied to the actuator compartment during the transition from the starting configuration to the end configuration, a characteristic curve (a, b, c, d) representing the progression of the pressure over time during the work process being determined and being stored in a storage apparatus,
- wherein the determined characteristic curve is compared with a reference characteristic curve stored in the storage apparatus, and/or the deviation from the reference characteristic curve is determined,
- wherein functional data which represent a functional state of the actuator are determined from the progression of the characteristic curve and/or the deviations from the reference characteristic curve, wherein the functional data represent a contracted and extended state of the actuator, and wherein the operating pressure supply is controlled depending on the functional data.

* * * * *